United States Patent
Zhang et al.

(10) Patent No.: US 11,439,122 B1
(45) Date of Patent: Sep. 13, 2022

(54) PET WATER BOTTLE

(71) Applicant: Shanghai Mimeng Network Technology Co., Ltd., Shanghai (CN)

(72) Inventors: Chong Zhang, Shanghai (CN); Lin Jin, Shanghai (CN); Tao Tong, Shanghai (CN)

(73) Assignee: Shanghai Mimeng Network Technology Co., Ltd., Shanghai (CN)

( * ) Notice: Subject to any disclaimer, the term of this patent is extended or adjusted under 35 U.S.C. 154(b) by 0 days.

(21) Appl. No.: 17/471,189

(22) Filed: Sep. 10, 2021

(30) Foreign Application Priority Data

Aug. 27, 2021 (CN) .......................... 202122052644.3

(51) Int. Cl.
*A01K 7/00* (2006.01)
*A45F 3/16* (2006.01)

(52) U.S. Cl.
CPC ................ *A01K 7/005* (2013.01); *A45F 3/16* (2013.01)

(58) Field of Classification Search
CPC . A01K 7/00; A01K 7/005; A01K 7/02; A01K 7/06; A45F 3/16
USPC ..................................................... 119/72, 74
See application file for complete search history.

(56) References Cited

U.S. PATENT DOCUMENTS

| 8,272,351 | B2 | 9/2012 | Hurwitz | |
|---|---|---|---|---|
| 8,371,244 | B2 | 2/2013 | Krasner | |
| 8,960,490 | B2 * | 2/2015 | Carlile | B65D 47/249 |
| | | | | 220/264 |
| 10,085,543 | B2 | 10/2018 | Breit | |

FOREIGN PATENT DOCUMENTS

| CN | 206728866 U | * | 12/2017 | ............... A01K 7/00 |
|---|---|---|---|---|
| CN | 207561116 U | * | 7/2018 | ............... A01K 7/00 |
| CN | 208113738 U | * | 11/2018 | ............... A01K 7/00 |

* cited by examiner

*Primary Examiner* — Peter M Poon
*Assistant Examiner* — Danielle A Clerkley
(74) *Attorney, Agent, or Firm* — True Shepherd LLC; Andrew C. Cheng

(57) ABSTRACT

A pet water bottle includes a shell, a triggering member, a transmission member and a first sealing member. A cavity for water storage is formed inside the shell, a first recessed region is formed on an outer surface of the shell, and a first through hole communicating with the cavity is arranged on an inner wall of the first recessed region; the first sealing member is arranged in the cavity, at least part of the transmission member is fixed inside the cavity, and the first sealing member is fixed onto the transmission member; the first through hole is in contact with and fully covered by the first sealing member; at least part of the triggering member is fixed outside the shell, and the triggering member and the transmission member are spaced apart from each other; the triggering member is capable of moving in a direction close to the transmission member.

8 Claims, 11 Drawing Sheets

PET WATER BOTTLE

CROSS-REFERENCE TO RELATED APPLICATIONS

This application claims priority to Chinese Patent Application No. 202122052644.3 with a filing date of Aug. 27, 2021. The content of the aforementioned application, including any intervening amendments thereto, is incorporated herein by reference.

TECHNICAL FIELD

The disclosure relates to the field of water bottles, in particular to a pet water bottle.

BACKGROUND

A pet water bottle is used for pets to drink water. A pet water bottle in the prior art is provided with a water storage tank connected with a base of a water basin and a timer control box electrically connected with a motor-driven water pump. Between the water storage tank and the water basin are a control valve configured to control the water level of the water basin and a circulating water three-way dividing pipe connected with the water pump, where one dividing branch of the three-way dividing pipe communicates with a water filtration basin, and another dividing branch is connected with a nozzle capable of spraying water mist or circulating water to the water basin. The main drawback to this kind of pet water bottle is that it is inconvenient to carry and can only be used indoors given that the water pump can only work under an electrified condition. However, quite often, pets need to go outdoors in daily life. Obviously, this kind of pet water bottle cannot meet the requirements for outdoor use.

SUMMARY

The technical problem to be solved by the disclosure is to provide a pet water bottle aiming at the problem that pet water bottles in the prior art are inconvenient to carry.

To solve the foregoing technical problem, embodiments of the disclosure provide a pet water bottle, including a shell, a triggering member, a transmission member and a first sealing member;

where a cavity for water storage is formed inside the shell, a first recessed region is formed on an outer surface of the shell, and a first through hole used for communicating with the cavity is arranged on an inner wall of the first recessed region;

the first sealing member is arranged in the cavity, at least part of the transmission member is fixed inside the cavity, and the first sealing member is fixed onto the transmission member; the first through hole is in contact with and fully covered by the first sealing member; and at least part of the triggering member is fixed outside the shell, and the triggering member and the transmission member are spaced apart from each other; the triggering member is capable of moving in a direction close to the transmission member, and when the triggering member is in contact with the transmission member and pushes the transmission member, the transmission member drives the first sealing member to exit from the first through hole, such that water in the cavity enters the first recessed region.

Beneficial effects of the embodiments of the disclosure are as follows: the transmission member is triggered by the triggering member to move so as to further control water discharge or not for the first through hole in the first recessed region. Only manually control on the triggering member is required, making the pet water bottle convenient to operate and carry.

BRIEF DESCRIPTION OF THE DRAWINGS

To describe the technical solutions in the embodiments of the disclosure or in the prior art more clearly, the following briefly introduces the accompanying drawings required for describing the embodiments or the prior art. Apparently, the accompanying drawings in the following description show merely some embodiments of the disclosure, and a person of ordinary skill in the art may still derive other drawings from these accompanying drawings without creative efforts.

DETAILED DESCRIPTION OF THE EMBODIMENTS

A clear and complete description of the technical solutions in the embodiments of the disclosure will be given below, in combination with the accompanying drawings in the embodiments of the disclosure. Apparently, the embodiments described below are a part, but not all, of the embodiments of the disclosure. All other embodiments obtained by a person of ordinary skill in the art based on the embodiments of the disclosure without inventive efforts fall within the protection scope of the disclosure.

Figure 1:
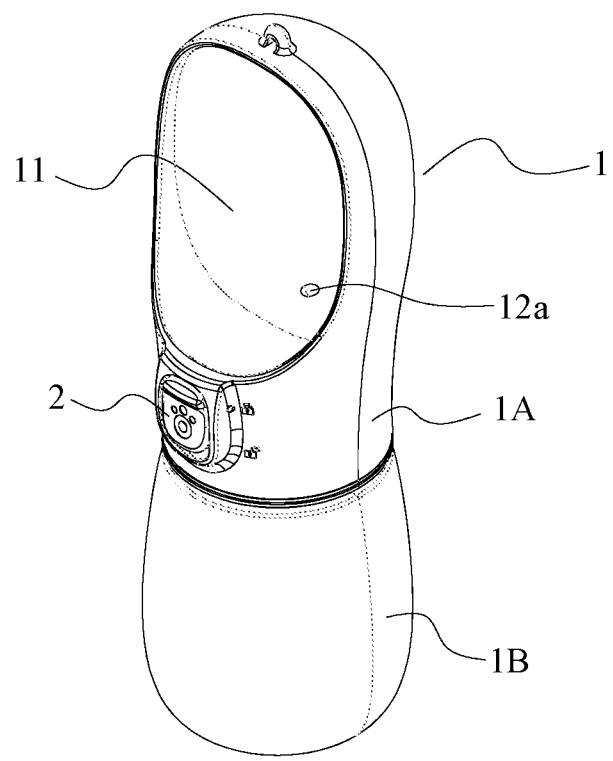
FIG. 1 is a schematic diagram illustrating a pet water bottle according to an embodiment of the disclosure.
Figure 2:
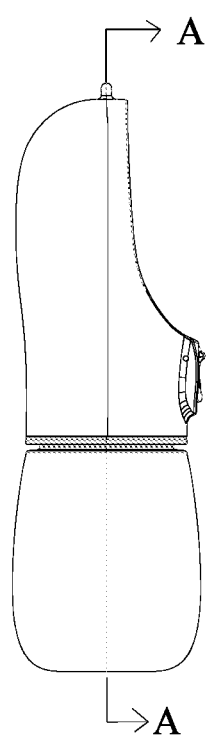
FIG. 2 is a side view of a pet water bottle according to an embodiment of the disclosure.
Figure 3:
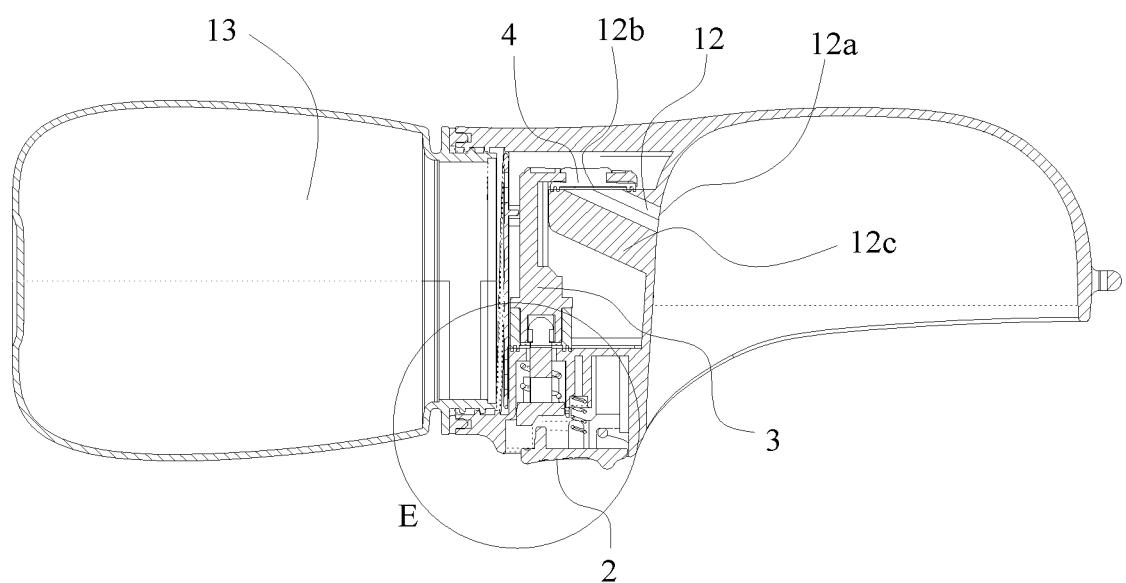
FIG. 3 is a sectional view along line A-A of FIG. 2.

As shown in FIGS. 1-3, a pet water bottle includes a shell 1, a triggering member 2, a transmission member 3 and a first sealing member 4. A cavity 13 for water storage is formed inside the shell 1, a first recessed region 11 is formed on an outer surface of the shell 1, and a first through hole 12 used for communicating with the cavity 13 is arranged on an inner wall of the first recessed region 11. The first sealing member 4 is arranged in the cavity 13, at least part of the transmission member 3 is fixed inside the cavity 13, and the first sealing member 4 is fixed onto the transmission member 3; the first through hole 12 is in contact with and fully covered by the first sealing member 4.

At least part of the triggering member 2 is fixed outside the shell 1, and the triggering member 2 and the transmission member 3 are spaced apart from each other; the triggering member 2 is capable of moving in a direction close to the transmission member 3, and when the triggering member 2 is in contact with the transmission member 3 and pushes the transmission member 3, the transmission member 3 drives the first sealing member 4 to exit from the first through hole 12, such that water in the cavity 13 enters the first recessed region 11.

The first through hole 12 includes a first opening 12a, a second opening 12b and a side wall 12c connected between the first opening 12a and the second opening 12b, where the first opening 12a is arranged on an inner wall of the first recessed region 11, and the second opening 12b is in contact with the first sealing member 4.

The triggering member 2 can be a key or a button. The transmission member 3 can be a driving rod or a connecting rod. The transmission member 3 can be assembled by one or more parts, which is not limited in the embodiments. For example, for the convenience of assembly, the transmission member 3 can be assembled by fixed connection of a first connecting rod 31 and a second connecting rod 32 which can be fixed connected with each other by way of a buckle or a screw, and a connection manner thereof is not limited herein. Specifically, the first sealing member 4 can be a rubber ring or a silica gel ring. The first recessed region 11 is used for containing water, a semi-opening shape of which can make it convenient for pets to drink water. Since a sealing member is usually made of a flexible material, in order to ensure close contact between the first sealing member 4 and the first through hole 12, a support plate 33 can be fixedly arranged on the transmission member 3, and the first sealing member 4 can be attached to the support plate 33. Additionally, at least one reinforcement rib can be arranged between the support plate 33 and the transmission member 3 for the purpose of reinforcing the stability of the support plate 33. The support plate 33 and the transmission member 3 can be integrally formed. Preferably, a plane where the support plate 33 is located is perpendicular to a transmission direction of the transmission member. In an implementation, the second opening 12b can be arranged between the triggering member 2 and the first sealing member 4; and in another implementation, the first sealing member 4 can be arranged between the second opening 12b and the triggering member 2. It should be noted that when the second opening 12b is arranged between the triggering member 2 and the first sealing member 4, only when the triggering member 2 is triggered by a user, the first sealing member 4 exits from the second opening 12b to allow water to be discharged out of the pet water bottle, making it more in line with user habits.

The shell 1 can be jointly assembled by one or a plurality of parts, where the plurality of parts can jointly form the complete cavity 13 by way of screw joint, snap joint, abutting joint or other means. In a preferred implementation, the shell 1 includes a first shell 1A and a second shell 1B which are in screw joint with each other. A third sealing member 8 is arranged at a joint of the first shell 1A and the second shell 1B. The triggering member 2 and the first recessed region 11 are arranged outside the first shell 1, and the first sealing member 4 is arranged inside the first shell 1; the interior of the first shell 1A and the interior of the second shell 1B jointly form the cavity 13 for water storage. The second shell 1B can serve as a main water storage space. By configuring the shell 1 as the separable first shell 1A and the second shell 1B, a user can conveniently inject water into the pet water bottle.

In the embodiments of the disclosure, the transmission member 3 is triggered by the triggering member 2 to move so as to further control water discharge or not for the first through hole 12 in the first recessed region 11, and all that a user needs is to manually control the triggering member 2, making the pet water bottle convenient to operate and carry.

When water is discharged via the first through hole 12 of the pet water bottle, a consistency between air pressures inside and outside the cavity 13 is required. Therefore, in the embodiments of the disclosure, a second through hole 15 communicating with the cavity 13 can be further arranged on the outer surface of the shell 1 to guarantee the consistency between pressures inside and outside the cavity. For this purpose, a further improvement in the structure of a pet water bottle will be described below.

Figure 4:
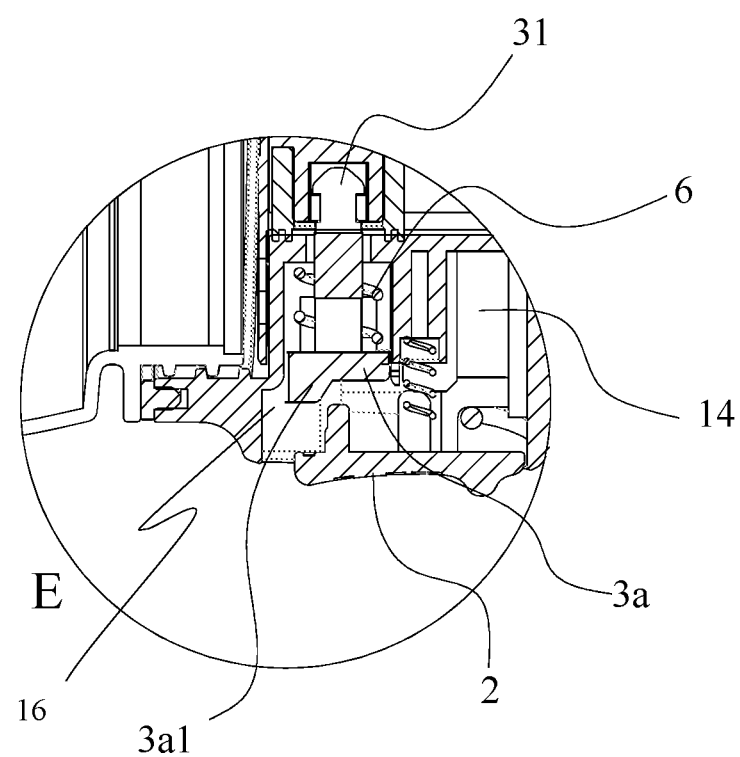
FIG. 4 is a partial enlarged view of a part E of FIG. 3.
Figure 7:
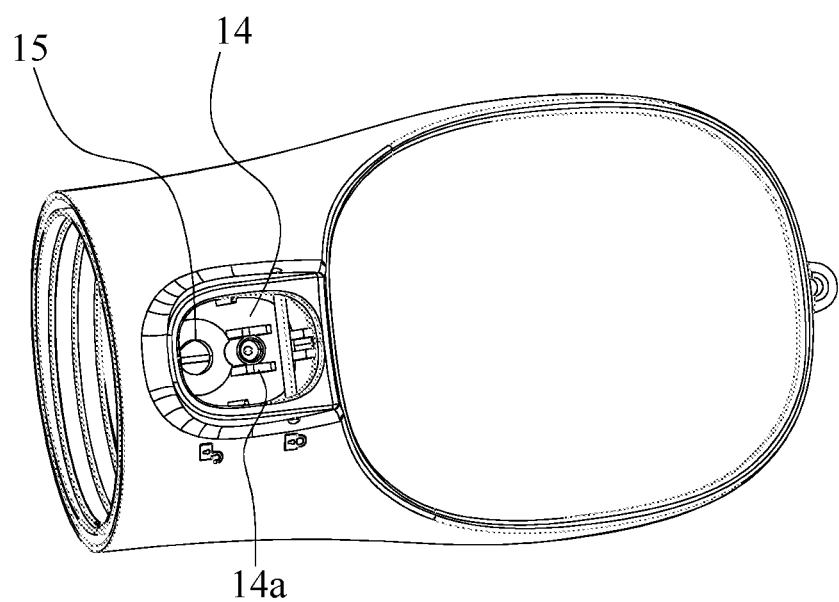
FIG. 7 is a structural schematic diagram illustrating an outer surface of a shell according to an embodiment of the disclosure.
Figure 8:
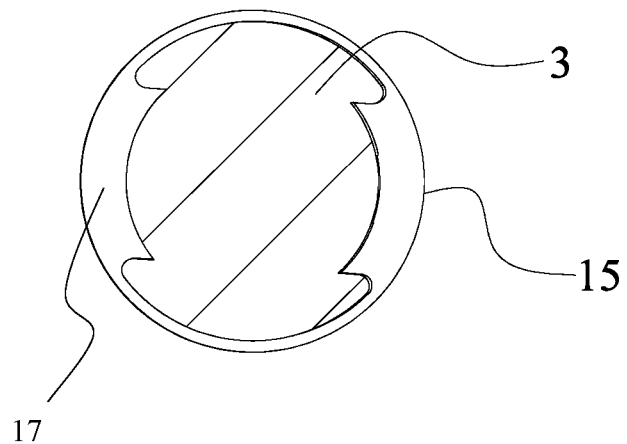
FIG. 8 is a schematic diagram illustrating a cross section of a second through hole of the disclosure.
Figure 14:
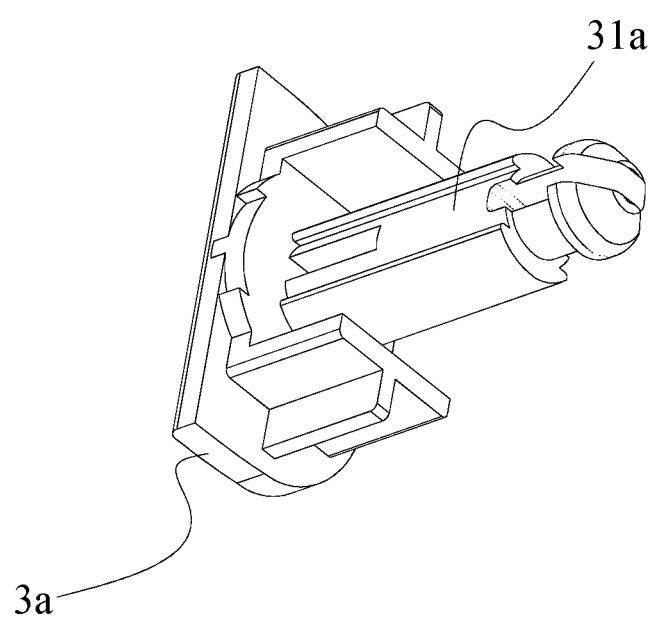
FIG. 14 is a structural schematic diagram illustrating a first connecting rod of the disclosure.

As shown in FIG. 7, a second recessed region 14 used for accommodating a triggering member 2 is further formed on an outer surface of a shell 1 (specifically see FIG. 4), and a second through hole 15 (specifically see FIG. 7) used for communicating with a cavity 13 is arranged on the second recessed region 14. Specifically, as shown in FIG. 4, a first gap 16 for outside air to enter the second through hole 15 is formed between the triggering member 2 and the second recessed region 14; and a transmission member 3 includes a first part, where the first part is a part, penetrating into the second through hole 15, of the transmission member 3, and has a cross-sectional area smaller than that of the second through hole 15, such that outside air enters the cavity 13 via the second through hole 15. It should be noted that the first part refers to the part, located in the second through hole 15, of the transmission member 3 when the transmission member 3 controls a first sealing member 4 to exit from a first through hole 12. The cross-sectional area at any portion of the first part shall be less than that of the second through hole 15. Specifically, in an implementation, it is possible to set a diameter of the transmission member 3 to be smaller than a hole diameter of the second through hole 15; in another implementation, as shown in FIG. 8, it is also possible to set the diameter of the transmission member 3 to be substantially the same as or slightly smaller than the hole diameter of the second through hole 15, and in this way, as shown in FIG. 14, one or more recessed grooves 31a can be arranged on an outer side wall of the first part of the transmission member 3.

In the embodiments of the disclosure, ventilation between the cavity 13 and the outside is realized by utilizing a gap between the triggering member 2 and the second recessed region 14 as well as a gap between the transmission member 3 and the second through hole 15, such that balance in pressures inside and outside the shell 1 is guaranteed, and water can be smoothly discharged out of the pet water bottle. In this way, there is no need to arrange an additional ventilation hole in a surface of the shell 1, which makes water leakage less likely to occur to the pet water bottle while lowering the structural complexity of the pet water bottle.

In the above solution, an air inlet passage for air to enter the cavity 13 is arranged on the shell 1, which, however, may lead to water leakage of the pet water bottle when water is not needed. Therefore, a further improvement is made in view of the situation in the embodiments of the disclosure.

Figure 5:
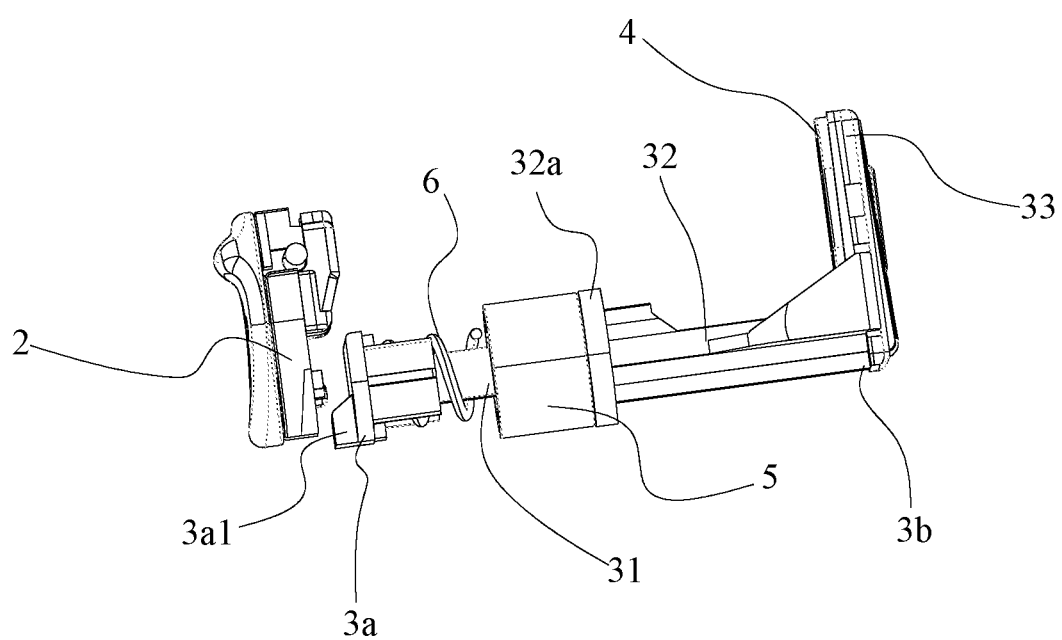
FIG. 5 is a schematic diagram illustrating assembly of a triggering member, a transmission member and a first sealing member of the disclosure.
Figure 6:
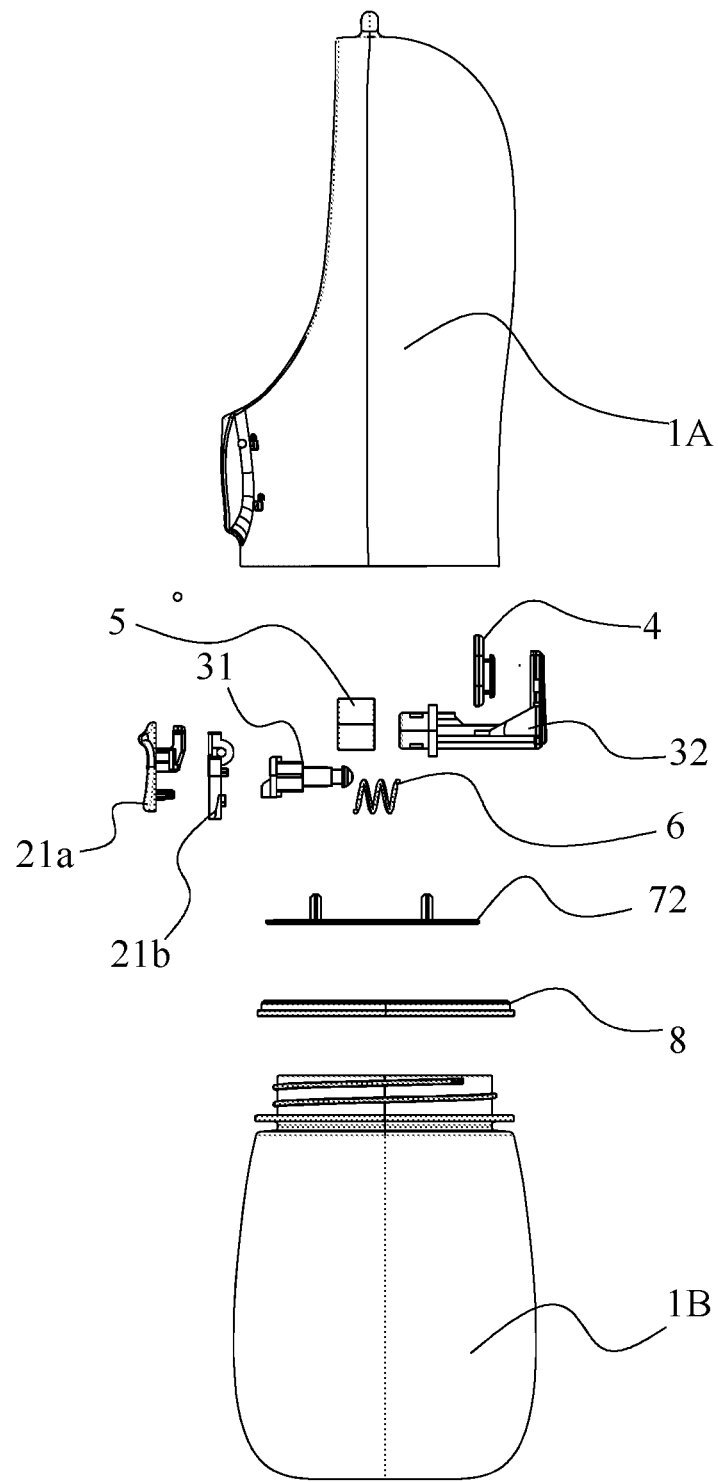
FIG. 6 is an explosive view of a pet water bottle according to an embodiment of the disclosure.

As shown in FIGS. 5-6, a pet water bottle includes a shell 1, a triggering member 2, a transmission member 3, a first sealing member 4 and a second sealing member 5. The structure and cooperative relationship of the shell 1, triggering member 2, the transmission member 3 and the first sealing member 4 have been described in detail above, and thus details will not be repeated herein.

The second sealing member 5 is located in a cavity 13 and arranged on the transmission member 3. The second sealing member 5 seals a second gap 17 between a first part and a second through hole 15; when the triggering member 2 is in contact with the transmission member 3 and pushes the transmission member 3, the second sealing member 5 follows the transmission member 3 to move away from the second gap 17, such that outside air enters the cavity 13. As shown in FIG. 5, specifically, the second sealing member 5 is an annular sealing ring sleeving the transmission member 3, a first limiting portion is arranged on the transmission member 3, and the annular sealing ring is located between the second through hole 15 and the first limiting portion. The arrangement of the first limiting portion can achieve close contact between the annular sealing ring and the second through hole 15, and when the triggering member 2 pushes the transmission member 3 to move, the first limiting portion is capable of moving in a direction away from the second through hole 15. In this way, a distance between the first limiting portion and the second through hole 15 is enlarged, then a gap can be accordingly formed between the annular sealing ring and the second through hole 15, allowing for outside air to enter the cavity 13 via the second through hole 15.

In the embodiments of the disclosure, the second sealing member 5 is arranged on the transmission member 3 so as to follow the transmission member 3 to move, and the second sealing member 5 is arranged at a junction of the second through hole 15 and the cavity 13 so as to block an air outlet passage. In this way, when the pet water bottle is not needed for water discharge, the second sealing member 5 can block the second through hole 15 to avoid water leakage of the pet water bottle; and when the pet water bottle is needed for water discharge, the second sealing member 5 can follow the transmission member 3 to move and exit from the junction of the second through hole 15 and the cavity 13, such that outside air can enter the cavity 13 via the second through hole 15, and a resulting balance between air pressures inside and outside the cavity makes it convenient for water in the cavity 13 to flow out smoothly.

In an effort to prevent water leakage of a pet water bottle, a further improvement is made in a driving structure of the pet water bottle in the embodiments of the disclosure, so as to guarantee close contact between a first sealing member 4 and a first through hole 12, and to prevent water leakage of the first through hole 12.

As shown in FIGS. 4-5, a pet water bottle includes a shell 1, a triggering member 2, a transmission member 3, an elastic member 6 and a first sealing member 4. The structure and cooperative relationship of the shell 1, triggering member 2, the transmission member 3 and the first sealing member 4 have been described in detail above, and thus details will not be repeated herein.

A second recessed region 14 used for accommodating the triggering member 2 is further formed on an outer surface of the shell 1, and a second through hole 15 communicating with a cavity 13 is arranged on the second recessed region 14. Specifically, as shown in FIG. 4, a first gap 16 for outside air to enter the second through hole 15 is formed between the triggering member 2 and the second recessed region 14; and a transmission member 3 includes a first part, where the first part is a part, penetrating into the second through hole 15, of the transmission member 3, and has a cross-sectional area smaller than that of the second through hole 15, such that outside air enters the cavity 13 via the second through hole 15. It should be noted that the first part refers to the part, located in the second through hole 15, of the transmission member 3 when the transmission member 3 controls the first sealing member 4 to exit from a first through hole 12. The cross-sectional area at any portion of the first part shall be less than that of the second through hole 15. Specifically, in an implementation, it is possible to set a diameter of the transmission member 3 to be smaller than a hole diameter of the second through hole 15; in another implementation, as shown in FIG. 8, it is also possible to set the diameter of the transmission member 3 to be substantially the same as or slightly smaller than the hole diameter of the second through hole 15, and in this way, one or more recessed grooves can be arranged on an outer side wall of the first part of the transmission member 3.

The first sealing member 4 is fixed to a first end 3b of the transmission member 3, and a second end 3a of the transmission member 3 is located in the second recessed region 14 and is contacted with the triggering member 2; and a cross-sectional area of the second end 3a is larger than that of the second through hole 15. An included angle between a direction from the first end 3b to the second end 3a and a first interface is greater than 0 degree and less than 180 degrees, specifically, the included angle is preferably 90 degrees. The first interface is located between the first sealing member 4 and the second end 3a, and the first interface is defined as an interface between the first through hole 12 and the cavity 13. The second end 3a and the elastic member 6 are located in the second recessed region 14, and the elastic member 6 abuts against a portion between the second end 3a and an inner wall of the second recessed region 14, such that the first sealing member 4 and the first through hole 12 are in close contact with each other. Specifically, the elastic member 6 can be a spring, and the spring can sleeve the transmission member 3, with one end abutting against the second end 3a and the other end abutting against the inner wall of the second recessed region 14.

In the embodiments of the disclosure, the elastic member 6 is arranged between the second end 3a of the transmission member 3 and the inner wall of the second recessed region 14, and with the elasticity of the elastic member 6, the first sealing member 4 is tightly pressed on the first through hole 12 to achieve close contact with the first through hole 12, thereby reducing the possibility that water in the cavity 13 leaks out of the first through hole 12.

When a user repeatedly drives the transmission member 3 via the triggering member 2, the transmission member 3 can further repeatedly drive the first sealing member 4 to make reciprocating motion. However, during such reciprocating movement, the transmission member 3 may deviate from an original movement trail, leading to misalignment of the first sealing member 4 with the first through hole 12, and leakage of water in the cavity 13 from the first through hole 12. In view of the foregoing problem, a further improvement is made in the embodiments of the disclosure.

Figure 9:
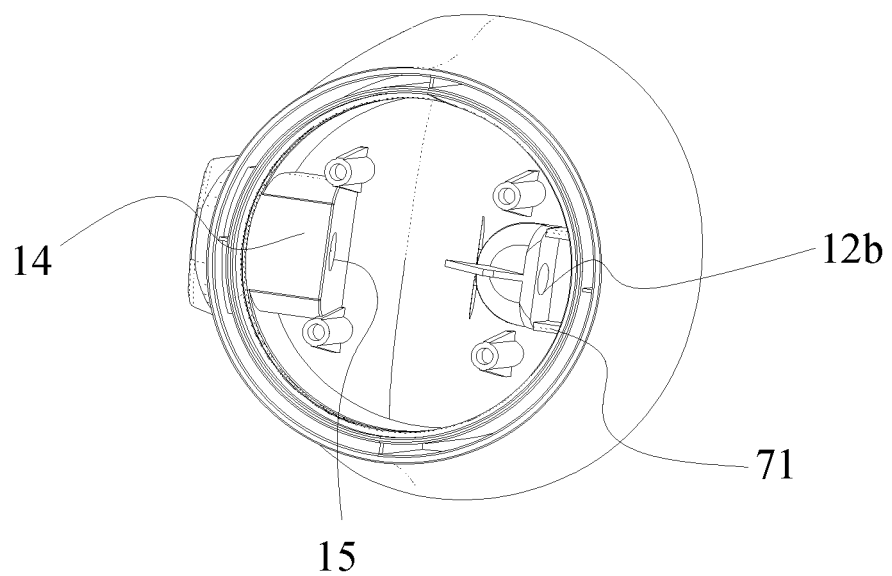
FIG. 9 is a structural schematic diagram illustrating the interior of a shell of the disclosure.
Figure 10:
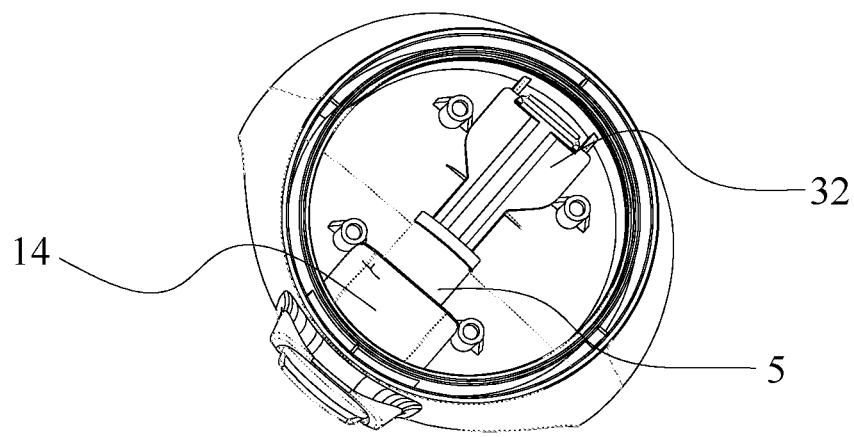
FIG. 10 is a structural schematic diagram illustrating the interior of a shell provided with a driving part of the disclosure.

As shown in FIGS. 9-10, a pet water bottle includes a shell 1, a triggering member 2, a transmission member 3, a first sealing member 4 and at least one limiting member. The structure and cooperative relationship of the shell 1, triggering member 2, the transmission member 3 and the first sealing member 4 have been described in detail above, and thus details will not be repeated herein.

Figure 11:
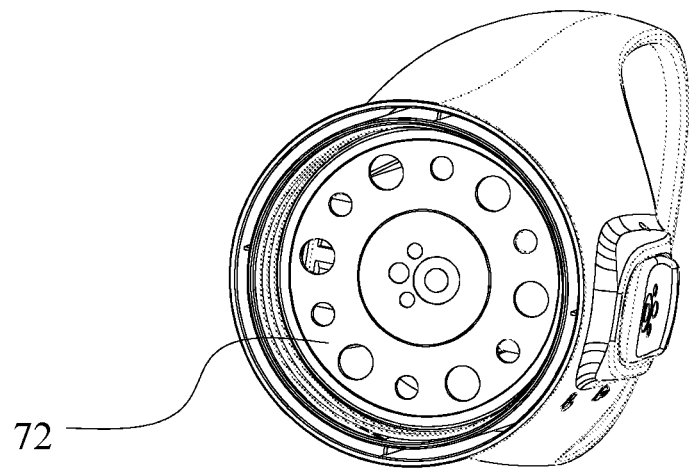
FIG. 11 is a structural schematic diagram of a third limiting portion according to an embodiment of the disclosure.

All the limiting parts are arranged around the first sealing member 4 with reference to a first line as an axis, and a distance between the limiting part and the first sealing member 4 is less than a first preset value, where the first line passes through the first sealing member 4 and is parallel to a transmission direction of the transmission member 3. There may be one or a plurality of limiting members arranged, and when there is only one limiting member, the limiting member can be of an annular hollow cylindrical structure with a first axis as the axis, in which the first sealing member 4 is located. When there are a plurality of limiting members, specifically, the at least one limiting member includes a second limiting portion 71 and a third limiting portion 72. The second limiting portion 71 is arranged on a side wall of a first through hole 12 or an inner wall of a cavity 13, and is used for making movement amplitude of the first sealing member 4 in a first direction less than the first preset value; and the first direction is perpendicular to the transmission direction of the transmission member 3 and an axial direction of the cavity. The third limiting portion 72 is fixed inside the cavity 13, and is used for making movement amplitude of the first sealing member 4 in a second direction less than the first preset value; and the second direction is perpendicular to the first direction and the transmission direction. In this way, the third limiting portion 72 can be of a planar structure, and a plane where the third limiting portion 72 is located is perpendicular to the axial direction of the cavity 13. Specifically, the third limiting portion 72 is fixedly connected with a bottom wall in a first recessed region, for example, a plurality of studs can be arranged on a side, facing the cavity 13, of the bottom wall in the first recessed region, such that the third limiting portion 72 is fixedly connected with the studs. The first sealing member 4 and the transmission member 3 are jointly located between the third limiting portion 72 and the bottom wall of the first recessed region 11. In order to ensure that water inside the cavity 13 can enter a space formed jointly by the third limiting portion 72 and an inner wall of the first recessed region 11, and can smoothly flow out of the first through hole 12, the cross-sectional area of the third limiting portion 72 shall be smaller than that of the cavity 13. Specifically, as shown in FIG. 11, a plurality of through holes can be arranged on the third limiting portion 72.

In the embodiments of the disclosure, the limiting member is utilized for limiting the movement amplitude of the first sealing member 4 deviating from an original movement trail to guarantee that the first sealing member 4 is aligned with the first through hole 12 to the greatest extent, thus avoiding water in the cavity 13 from leaking out of the first through hole 12.

Figure 12:
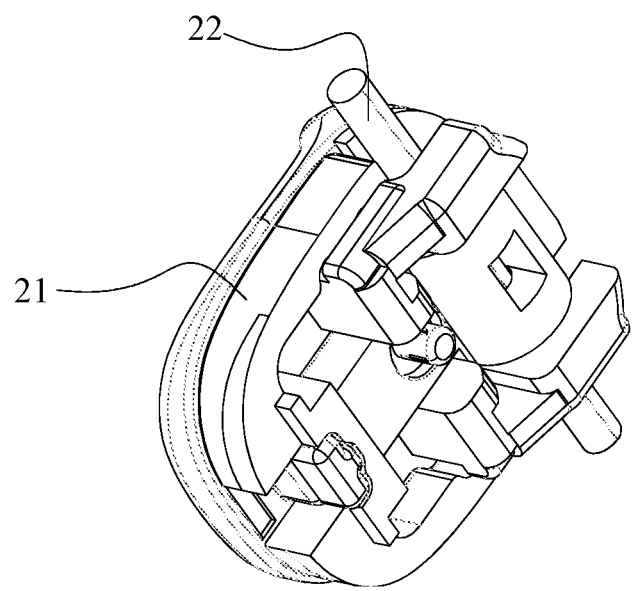
FIG. 12 is a schematic diagram illustrating a stereoscopic structure of a triggering member according to an embodiment of the disclosure.
Figure 13:
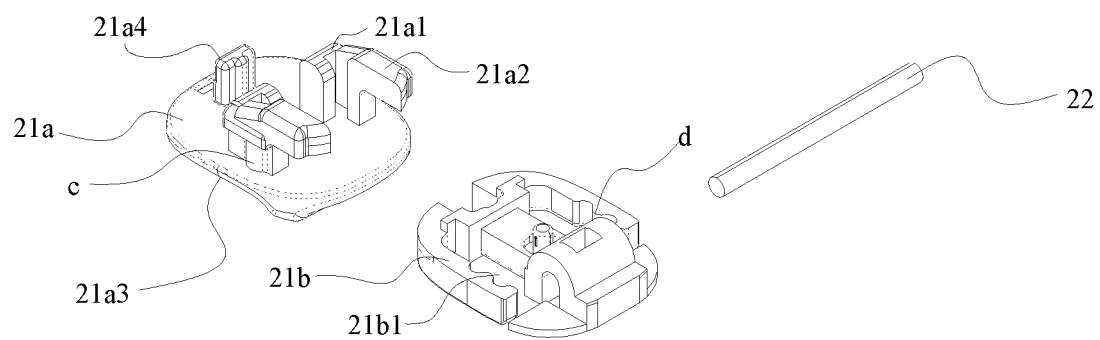
FIG. 13 is an explosive view of a triggering member according to an embodiment of the disclosure.

As shown in FIGS. 12-13, the triggering member 2 includes a key 21 and a fixation pin 22, where the fixation pin 22 is fixed onto the shell 1, and the key 21 is provided with a third through hole for the fixation pin 22 to penetrate through, such that the key 21 can rotate around the fixation pin 22 to be in contact with a second end 3a of the transmission member 3.

The key 21 includes a surface body 21a and a fixed base 21b. The surface body 21a is contacted with hands of a user. The fixed base 21b is arranged between the surface body 21a and a second recessed region 14. A third through hole is arranged on the fixed base 21b. A clamping part is arranged on the fixed base 21b, the surface body 21a is coupled with the clamping part, and the clamping part enables the surface body 21a to be fixed at a first position or a second position, and slide between the first position and the second position. Specifically, the clamping part can be of a wave structure d with two wave troughs, and can be made of an elastic material. The surface body 21a is provided with a wave crest structure c matched with the wave troughs in shape, and the wave crest structure can be stuck at the first position or the second position through the two troughs of the clamping part, such that the surface body 21a is fixed at the first position or the second position. Specifically, the surface body 21a includes a touch part 21a3 and an arm part 21a2. An outer surface of the touch part is contacted with the hands of the user, the arm part 21a2 is arranged on an inner surface of the touch part, and the wave crest structure c is arranged on a side wall of the arm part. The fixed base 21b is provided with a through groove 21b1 for the arm part to penetrate through, and a side wall of the through groove is correspondingly provided with the wave structure d. The arm part 21a2 penetrates out of the fixed base 21b, and a space for the fixation pin 22 to penetrate through is formed between the arm part 21a2 and the fixed base 21b. The bottom of the second recessed region 14 is also provided with a support part 14a for supporting the triggering member 2 so as to avoid the contact between the triggering member 2 and the second end 3a caused by unintended triggering of the user when the surface body 21a is located at the first position. Specifically, the arm part of the surface body 21a is provided with a force bearing part 21a1 abutting against the support part 14a. Further, the force bearing part 21a1 and the support part 14a are each provided with a corresponding first inclined plane for the surface body 21a to slide to the second position.

When the surface body 21a is located at the first position, the triggering member 2 and the second end 3a are spaced apart from each other; and when the surface body 21a is located at the second position, the triggering member 2 abuts against the second end 3a to enable the transmission member 3 to drive the first sealing member 4 to exit from the first through hole 12. When the surface body 21a is located at the second position, a protruding part is arranged on the triggering member 2 or the second end to make the triggering member 2 in better contact with the second end 3a of the transmission member 3. Specifically, a first protruding part 21a4 can be arranged on the surface body 21a, a through groove for the first protruding part 21a4 to penetrate through is arranged on the fixed base 21b, a second protruding part 3a1 is arranged at the second end 3a, and a second inclined plane for the first protruding part 21a4 to slide to the second protruding part 3a1 is correspondingly arranged on each of the first protruding part 21a4 and the second protruding part 3a1.

The solutions of the triggering member 2 provided by the embodiments of the disclosure can increase the convenience of user operation while reducing unintended triggering.

The above disclosed is only preferred embodiments of the disclosure, and definitely shall not be used to limit the scope of the claims of the disclosure. A person of ordinary skill in the art can understand all or some of the procedures for implementing the foregoing embodiments and make equivalent changes according to the claims of the disclosure. The equivalent changes still fall within the scope of the disclosure.

What is claimed is:

1. A pet water bottle, comprising a shell, a triggering member, a transmission member and a first sealing member;
   wherein a cavity for water storage is formed inside the shell, a first recessed region is formed on an outer surface of the shell, and a first through hole used for communicating with the cavity is arranged on an inner wall of the first recessed region;

at least part of the transmission member is fixed inside the cavity, and the first sealing member is fixed onto the transmission member; the first through hole is in contact with and fully covered by the first sealing member;

at least part of the triggering member is fixed outside the shell, and the triggering member and the transmission member are spaced apart from each other; and the triggering member is capable of moving in a direction close to the transmission member, and when the triggering member is in contact with the transmission member and pushes the transmission member, the transmission member drives the first sealing member to exit from the first through hole, such that water in the cavity enters the first recessed region;

a second recessed region used for accommodating the triggering member is further formed on the outer surface of the shell, and a second through hole used for communicating with the cavity is arranged on the second recessed region;

the transmission member penetrates into the second through hole, the first sealing member is fixed to a first end of the transmission member, and a second end of the transmission member is located in the second recessed region and is contacted with the triggering member; and the triggering member comprises a key and a fixation pin, the fixation pin is fixed onto the shell, and the key is provided with a third through hole for the fixation pin to penetrate through, such that the key can rotate around the fixation pin to be in contact with the second end;

the key comprises a surface body and a fixed base; the fixed base is arranged between the surface body and the second recessed region; and the third through hole is arranged on the fixed base;

a clamping part is arranged on the fixed base, the surface body is coupled with the clamping part, and the clamping part enables the surface body to 1) be fixed at one of: a first position or a second position, and 2) slide between the first position and the second position; and when the surface body is located at the first position, the triggering member and the second end are spaced apart from each other; and when the surface body is located at the second position, the triggering member abuts against the second end to enable the transmission member to drive the first sealing member to exit from the first through hole.

2. The pet water bottle according to claim 1, wherein a second recessed region used for accommodating the triggering member is further formed on the outer surface of the shell, and a second through hole used for communicating with the cavity is arranged in the second recessed region;

a first gap for outside air to enter the second through hole is formed between the triggering member and the second recessed region; and the transmission member comprises a first part, wherein, the first part is a part, penetrating into the second through hole, of the transmission member, and has a cross-sectional area smaller than that of the second through hole, such that outside air enters the cavity via the second through hole.

3. The pet water bottle according to claim 2, wherein the pet water bottle further comprises a second sealing member which is located in the cavity and arranged on the transmission member; the second sealing member seals a second gap between the first part and the second through hole; and when the triggering member is in contact with the transmission member and pushes the transmission member, the second sealing member follows the transmission member to move away from the second gap, such that outside air enters the cavity.

4. The pet water bottle according to claim 3, wherein the second sealing member is an annular sealing ring sleeving the transmission member, a first limiting portion is arranged on the transmission member, and the annular sealing ring is located between the second through hole and the first limiting portion.

5. The pet water bottle according to claim 3, wherein the shell comprises a first shell and a second shell which are in screw joint with each other; and a third sealing member is arranged at a joint of the first shell and the second shell;

the triggering member and the first recessed region are arranged outside the first shell, and the first sealing member is arranged inside the first shell; and the interior of the first shell and the interior of the second shell jointly form the cavity for water storage.

6. The pet water bottle according to claim 2, wherein the pet water bottle further comprises an elastic member; the first sealing member is fixed to a first end of the transmission member, and a second end of the transmission member is located in the second recessed region and is contacted with the triggering member; a cross-sectional area of the second end is larger than that of the second through hole;

an included angle between a direction from the first end to the second end and a first interface is greater than 0 degree and less than 180 degrees, the first interface is located between the first sealing member and the second end, and the first interface is defined as an interface between the first through hole and the cavity; and the second end and the elastic member are located in the second recessed region, and the elastic member abuts against a portion between the second end and an inner wall of the second recessed region, such that the first sealing member and the first through hole are in close contact with each other.

7. The pet water bottle according to claim 1, wherein the pet water bottle further comprises at least one limiting part located in the cavity.

8. The pet water bottle according to claim 7, wherein the at least one limiting part comprises a second limiting portion and a third limiting portion;

the first through hole comprises a first opening, a second opening and a side wall connected between the first opening and the second opening, the first opening is arranged on an inner wall of the first recessed region, the second opening is contact with the first sealing member, and the side wall and the second opening are arranged inside the shell;

the second limiting portion is arranged on the side wall or an inner wall of the cavity, and is used for making movement amplitude of the first sealing member in a first direction less than the first preset value; and the first direction is perpendicular to the transmission direction of the transmission member and an axial direction of the cavity; and the third limiting portion is fixed inside the cavity, and is used for making movement amplitude of the first sealing member in a second direction less than the first preset value; and the second direction is perpendicular to the first direction and the transmission direction.

* * * * *